(12) United States Patent
Dumenil

(10) Patent No.: US 10,451,285 B2
(45) Date of Patent: Oct. 22, 2019

(54) DUAL COOKING MODE BBQ GRILL

(71) Applicant: Waco Pacific Ltd., New Territories, Hong Kong (CN)

(72) Inventor: Sean Dumenil, Victoria (AU)

(73) Assignee: Waco Pacific Ltd., New Territories, Hong Kong (CN)

( * ) Notice: Subject to any disclaimer, the term of this patent is extended or adjusted under 35 U.S.C. 154(b) by 0 days.

(21) Appl. No.: 15/517,704

(22) PCT Filed: Oct. 8, 2015

(86) PCT No.: PCT/IB2015/001821
§ 371 (c)(1),
(2) Date: Apr. 7, 2017

(87) PCT Pub. No.: WO2016/055849
PCT Pub. Date: Apr. 14, 2016

(65) Prior Publication Data
US 2018/0073739 A1    Mar. 15, 2018

(30) Foreign Application Priority Data

Oct. 8, 2014 (HK) .................................... 14110035

(51) Int. Cl.
*A47J 37/06* (2006.01)
*A47J 37/07* (2006.01)
(Continued)

(52) U.S. Cl.
CPC .................. *F24C 1/02* (2013.01); *A23L 5/10* (2016.08); *A47J 37/0635* (2013.01);
(Continued)

(58) Field of Classification Search
CPC .... F24C 11/00; A47J 37/0635; A47J 37/0652; A47J 37/0709; A47J 37/0713
USPC .......................... 99/340, 390, 397, 401, 447
See application file for complete search history.

(56) References Cited

U.S. PATENT DOCUMENTS

| 5,094,221 A | 3/1992 | Ho |
| 5,524,610 A * | 6/1996 | Clark ...................... F24S 23/70 126/682 |

(Continued)

FOREIGN PATENT DOCUMENTS

| CN | 2230879 Y | 7/1996 |
| JP | 6-237866 A | 8/1994 |

OTHER PUBLICATIONS

CN2230879translation, published Jul. 10, 1996 (Year: 1996).*
(Continued)

*Primary Examiner* — Reginald Alexander
(74) *Attorney, Agent, or Firm* — Leydig, Voit & Mayer, Ltd.

(57) ABSTRACT

A dual cooking mode barbecue grill includes a grill body which defines an open top cooking chamber, a cooking shelf for supporting food to be cooked and located above the open top cooking chamber, and a rotatable cooking unit located inside the open top cooking chamber. The rotatable cooking unit has a first cooking mode and a second cooking mode. The first and second cooking modes are alternatively selected by rotating the rotatable cooking unit with respect to the grill body.

16 Claims, 19 Drawing Sheets

(51) Int. Cl.
    *F24C 1/02*          (2006.01)
    *F24C 1/04*          (2006.01)
    *A23L 5/10*          (2016.01)

(52) U.S. Cl.
    CPC ......... *A47J 37/0652* (2013.01); *A47J 37/074* (2013.01); *A47J 37/0709* (2013.01); *A47J 37/0713* (2013.01); *A47J 37/0736* (2013.01); *F24C 1/04* (2013.01)

(56) References Cited

U.S. PATENT DOCUMENTS

| | | | |
|---|---|---|---|
| 5,782,230 A * | 7/1998 | Linnebur | A47J 37/0713 |
| | | | 126/38 |
| 6,073,542 A * | 6/2000 | Perez | A47J 37/067 |
| | | | 126/39 BA |
| 9,924,830 B1 * | 3/2018 | Glucksman | A47J 27/002 |
| 2005/0051152 A1 | 3/2005 | Cantal | |
| 2009/0272278 A1 | 11/2009 | von Herrmann et al. | |
| 2010/0083846 A1 | 4/2010 | Adams | |
| 2014/0000463 A1 | 1/2014 | Di Mauro et al. | |

OTHER PUBLICATIONS

European Patent Office: Extended European Search Report of European Patent Application No. EP 15 84 8641, dated May 7, 2018.

State Intellectual Property Office of the P.R. China; Search Report in International Patent Application No. PCT/IB2015/001821 (dated Feb. 6, 2016).

\* cited by examiner

DUAL COOKING MODE BBQ GRILL

TECHNICAL FIELD

The present invention relates to a BBQ grill and particularly, but not exclusively, to a dual cooking mode BBQ grill that can use electricity and gas for cooking.

BACKGROUND

Barbecue (BBQ) is a relatively simple cooking method that yields yet very delicious results. Generally, barbecue is a quick and simple way of preparing food by using a heat source to directly heating the ingredients. The use of different heat sources such as charcoal and wood is known to affect the taste of the food differently.

Due to barbecue's popularity, there are many types of barbecue grills commercially available on the market. For example, there are the "open flame" type grills that use fuels such as wood and charcoal. And then there are "non-open flame" type grill that uses electricity for powering a heating element for cooking. As there are many different regulations in different countries regarding kitchen appliances, a prospect buyer generally will have to purchase multiple grills for use in different areas such as a charcoal grill to be used outdoor and an electric grill to be used indoor.

SUMMARY OF THE INVENTION

According to a first aspect of the invention there is provided a dual cooking mode BBQ grill comprises, a grill body defining an open top cooking chamber, a cooking shelf for supporting food to be cooked positioned above of the open top cooking chamber and a rotatable cooking unit located within the open top cooking chamber, the rotatable cooking unit having a first cooking mode and a second cooking mode, wherein the first and second cooking modes are alternatively selected by rotating of the cooking unit with respect to the grill body.

Preferably, one of the first or second cooking modes is alternatively selectable by rotating the cooking unit through 180 degrees with respect to the other one of the cooking modes.

Preferably, the garbage receptacle supporting device further including an orthogonal offset portion between the supporting portion and the supporter portion.

Preferably, the first cooking mode is a gas cooking mode and the second cooking mode is an electric cooking mode.

Preferably, the rotatable cooking unit comprises a first hub, a second hub, a reflector located between the first and second hub, the reflector having a first reflective surface and a second reflective surface, a first cooking mode element located adjacent the first reflective surface, and a second cooking mode element located adjacent the second reflective surface.

Preferably, the first cooking, mode element is a gas burner and the second cooking mode element is an electric heating element.

Preferably, the first cooking mode element is mounted with the first hub and the second cooking mode element is mounted with the second hub.

Preferably, the reflector is removably supported between the first and second hubs.

Preferably, the first and second reflective surfaces of the reflector are opposite each other.

Preferably, the dual cooking mode BBQ grill further including a gas regulator and an electric regulator, wherein the gas regulator is mounted with the first hub in fluid communication with the gas burner and the electric regulator is mounted with the second hub and electrically connected with the electric heating element.

Preferably, the gas regulator further comprises a gas adapter and an adjustment valve which has a continuous level of adjustments between an open and closed position, and the electric regulator further comprises an electric socket and a thermostat for regulating the electrical power being supplied to the electric heating element.

Preferably, the first and second hubs are connected with each by a frame member.

Preferably, the frame member is at least one strut.

Preferably, the grill body comprises a first end wall and a second end wall defining respective ends of the open top cooking chamber, and wherein the first hub is rotatably mounted with the first end wall and the second hub is rotatably mounted with the second end wall.

Preferably, the first end wall includes a first aperture, the first hub rotatably located within the first aperture, and the second end wall includes a second aperture, the second hub rotatably located within the second aperture.

Preferably, the dual cooking mode BBQ grill further comprises a locking mechanism having a locking position and a released position, wherein in the locking position the locking mechanism rotationally locks one of the first or second hubs with a respective one of the first or second walls.

Preferably, the dual cooking mode BBQ grill further comprises a manually operable portion mounted with one of the first or second hubs.

Preferably, the manually operable portion is a handle that is rotatable through at least 180 degrees for rotating the cooking unit through 180 degrees.

Preferably, the dual cooking mode BBQ grill further comprises a movable lid attached to the grill body and movable between an open position and closed position; wherein in the closed position the lid encloses the open top cooking chamber.

Preferably, a lid handle and a thermometer are mounted with the movable lid.

Preferably, the cooking shelf is a plate, griddle, grill or a pan.

According to another aspect of this invention, there is provided a method of changing between a first cooking mode and a second cooking mode in a dual cooking mode BBQ grill, the method comprising rotating a cooking unit located within a cooking chamber of the grill through at least 90 degrees, but more preferably 180 degrees.

Preferably, the method comprises supplying gas to a gas burner of the first cooking mode or supplying electricity to an electric heating element of the second cooking mode.

Preferably, the cooking unit located within the cooking chamber of the grill can be rotated by a handle outside the cooking chamber for rotating the cooking unit through 180 degrees in order to select one of the first or second cooking modes.

Preferably, the dual cooking mode BBQ grill comprises a movable lid for encapsulation of the cooking chamber so as to enhance cooking ability, and a temperature gauge mounted with the lid for measurement of the cooking chamber's temperature.

Further aspects and embodiments of the invention will become apparent to the skilled person from the description and appended claims which are given by the way of example only to illustrate one or more embodiments of the invention.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
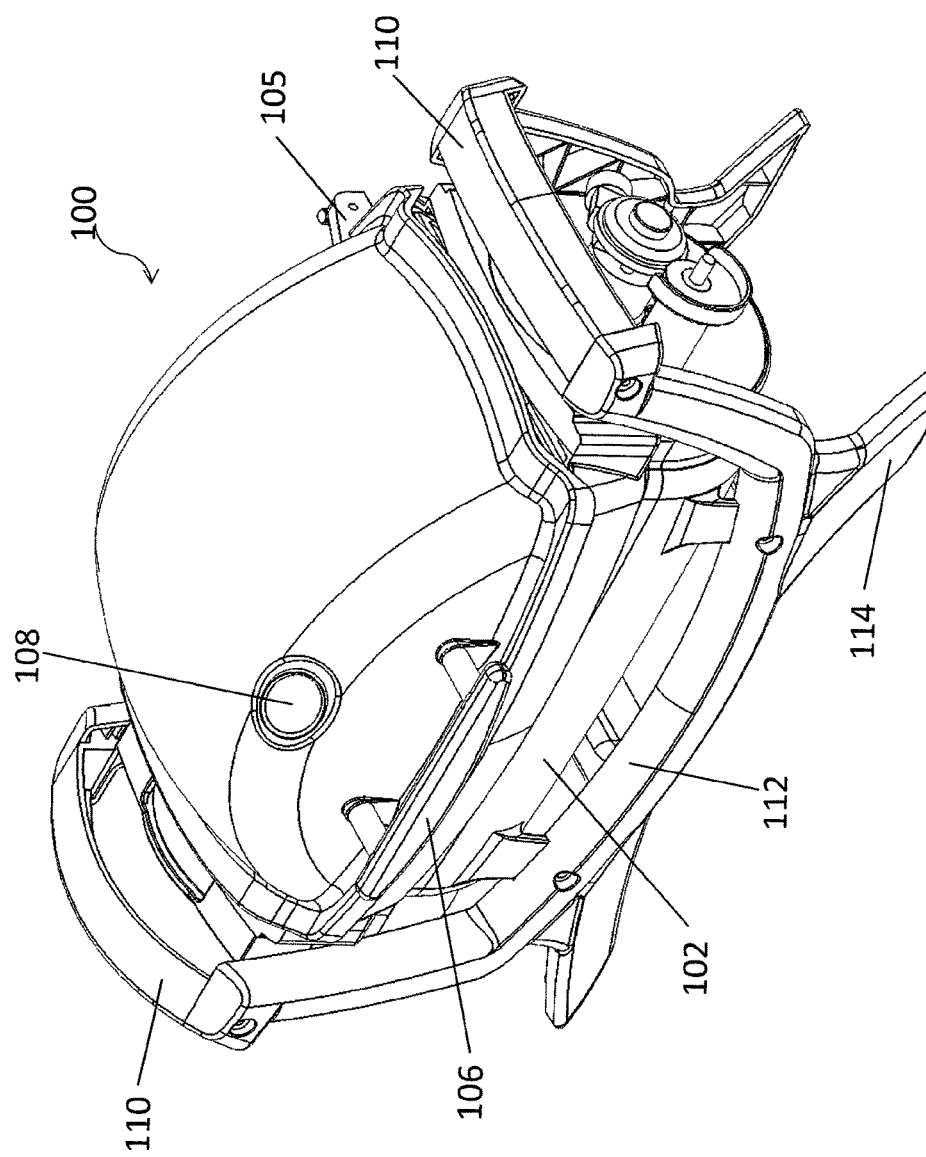
FIG. 1 is a perspective view of a BBQ grill in accordance with one embodiment of the present invention.

The following description is given by way of example only to illustrate preferred embodiments of the invention. In particular, the language and terminology used herein is for descriptive purposes only and is not intended to limit the scope or functionality of the invention. The invention may be employed in various combinations or embodiments utilizing various elements and means not explicitly described herein, but within the knowledge and skill of one ordinarily skilled in the art.

There is shown in the drawings a dual cooking mode barbeque (BBQ) grill according to the invention. The dual cooking mode BBQ grill 100 has a grill body 102 that can be covered by a movable lid 104. The grill body 102 is of a transversely expanding form factor and the grill body has an imaginary axis 101 indicating the expending direction. The movable lid 104 is pivotably mounted with the grill body 102 between an open position and a closed position. The movable lid 104 is attached to a plurality of hinges 105 on the top edge of the grill body 104 and the movable lid is pivotable about the hinges 105. However, a person skilled in the art would appreciate the use of other attaching means such as a linkage or gearings for attaching the lid to the grill body. The movable lid 104 has a lid handle 106 integrally formed. The lid handle 104 is used for operating the lid and it can be covered with thermal insulation material so as to improve the safety aspects of using the movable lid 104 when the grill is powered or heated. In addition to the lid handle 106, a temperature gauge 108 is also mounted with the movable lid 104. Such an addition is beneficiary to the BBQ grill as it provides an easily accessible readout of the BBQ grill's current operating temperature.

The grill body 102 is mounted with a frame structure 112 that includes at least two transverse frames for supporting the grill body and at least one frame handle on each transverse end of the grill body. The frame structure 112 also includes a plurality of legs 114 that are integrally formed on the lowest surface of the frame structure. The frame structure 112 is formed by using a hollow piece of rigid material that has a plurality of trusses formed internally for added strength whilst maintaining a light overall weight. The frame handles 110 and the legs 114 are also formed as parts of the frame structure with the same internal truss design. The frame handles 110 are located opposite to each other at two furthest end of the frame structure 112 for improved ergonomics. The legs 114 are in pairs and each pair is located opposite to another pair across the depth of the grill body 102.

Figure 2:
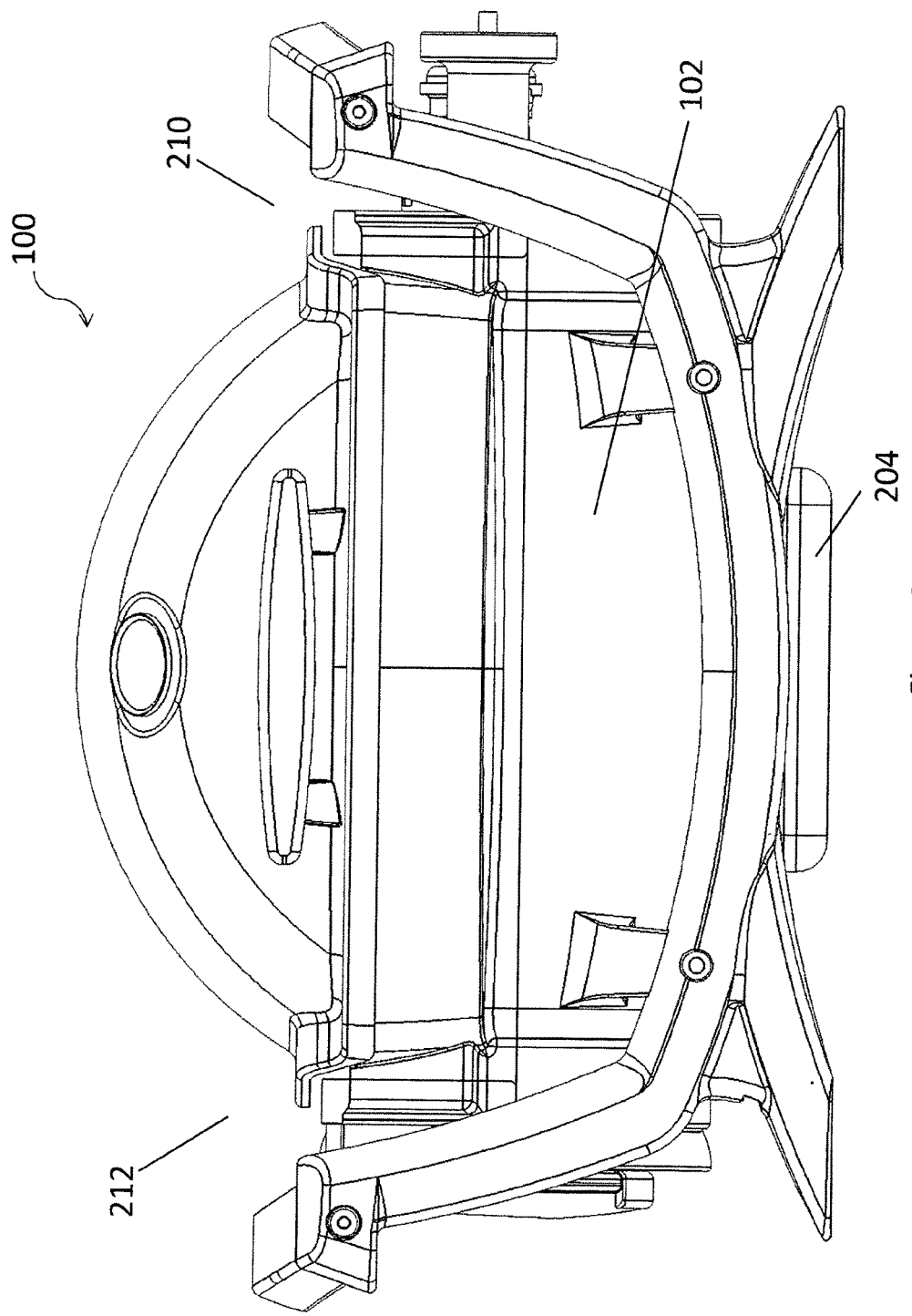
FIG. 2 is a front view of the BBQ grill of FIG. 1.

The grill body 102 has a first end 210 and a second end 212 as shown in FIG. 2. The first and second ends 210, 212 are opposite to each other and near a respective frame handle 110. The grill body 102 also has a drip pan 204 detachably mounted beneath the grill body 102. The drip pan 204 is detachable from the grill body 102 so a user can take the drip pan out for better cleaning and maintenance. The drip pan is used to for collecting any food residual collected inside the grill body 102 from normal usage.

Figure 3:
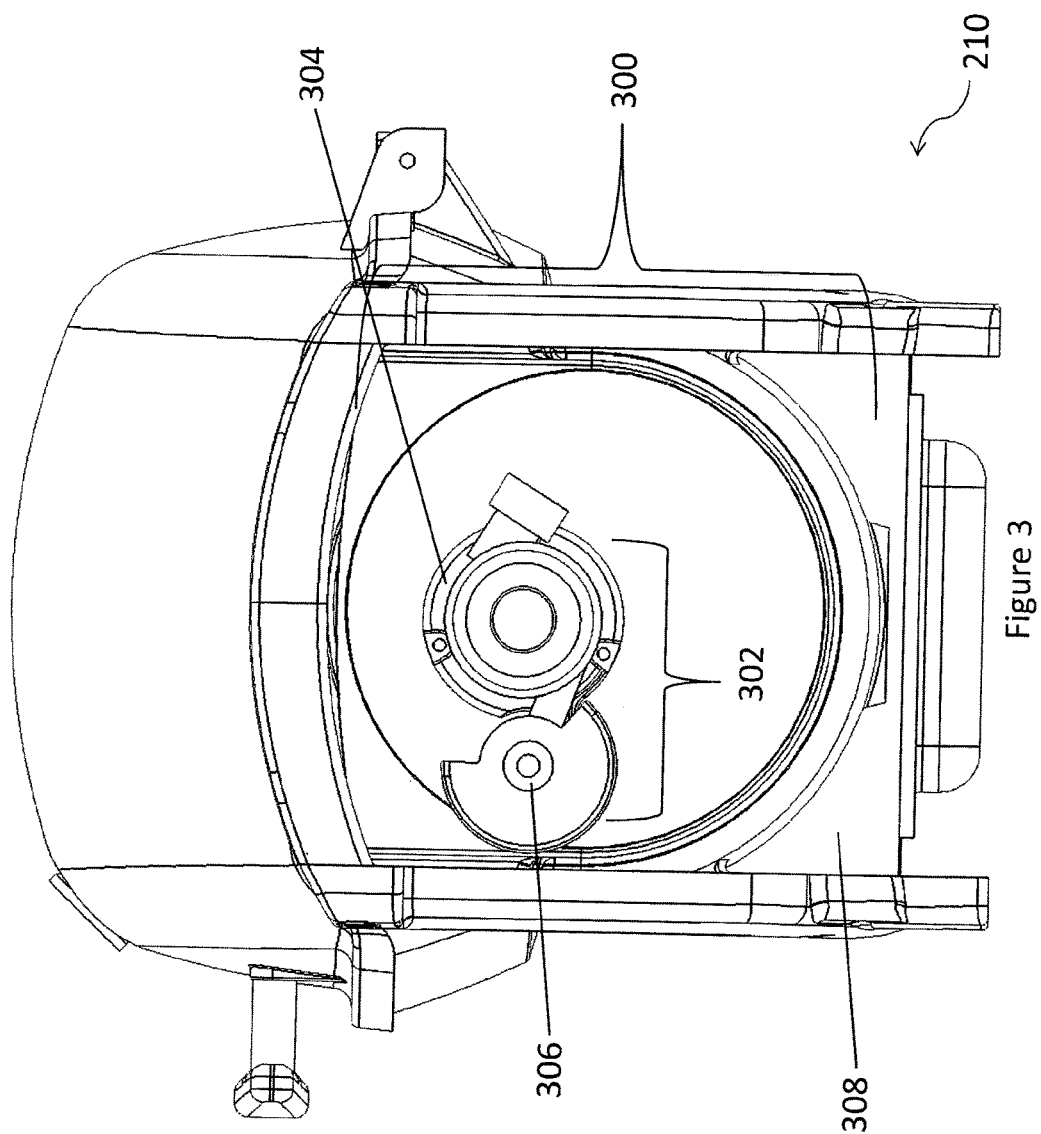
FIG. 3 is a right view of the BBQ grill of FIG. 1.

At the first end 210 of the BBQ grill 100 as shown in FIG. 3, there is a first hub 300, which is consisting of a gas regulator 302 for fluid communication with a gas reservoir (not shown). The first hub 300 is mounted with a first end wall 308 at the first end 210. Similarly (but not restricted) the first end wall 308 also has a shape matching aperture for mounting of the first hub 300 in a manner as the first end wall 308 to the first hub 300. The gas regulator 302 is consisting of a gas adapter 304 and a gas adapter bracket 306. Even though there is not a manually operable portion in connection with the first hub 300, a person skilled in the art would appreciate that such a design is also plausible and not un-motivated. The adapter 304 of the gas regulator 302 is fixed on the first hub 300 in order to provide a stable mounting location for the gas adapter bracket 306. As the first hub 300 is also subjected to rotational movement, it is important to provide a stable structure for the gas adapter bracket 306 in order to prevent gas leak due to movements.

Figure 4:
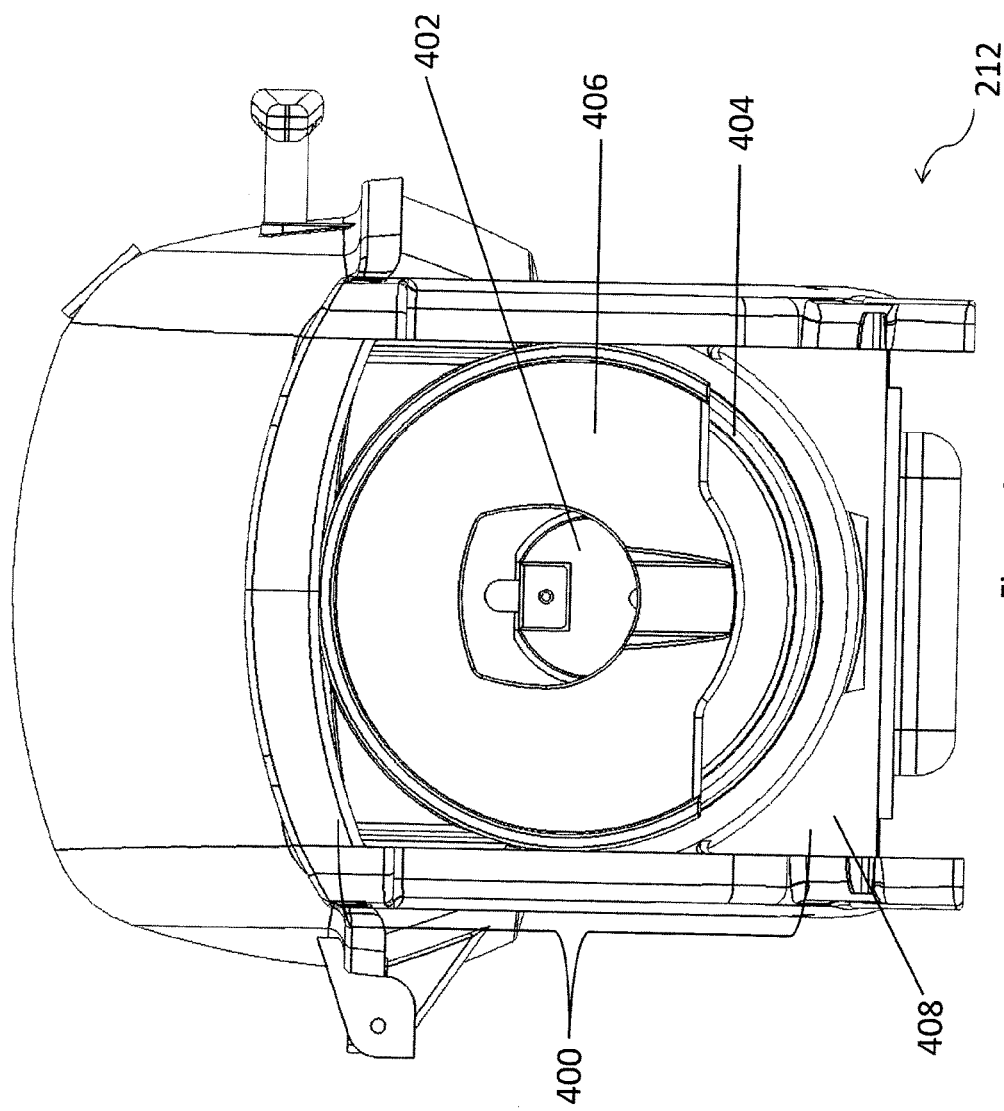
FIG. 4 is a left view of the BBQ grill of FIG. 1.

At the second end 212 of the BBQ grill 100 as shown in FIG. 4, there is a second hub 400, which is consisting of an electric regulator 402 and a manually operable portion 404. The second hub 400 is mounted with a second end wall 408 at the second end 212. The second end wall 408 has a shape matching aperture for mounting of the second hub 400 with a plurality of balls and grooves as the supporting means to allow rotational movement of the second hub. Although a person skilled in the art would appreciate that other bearing types could also be used for mounting the second hub. The electric regulator 302 is consisting of an electric socket for power supply and a thermostat (not shown) for voltage control based on temperature parameters. The manually operable portion 404 is used for rotating the second hub 400 and is incorporated with the second hub 400. However, as the manually operable portion 404 can also be incorporated to the other hub or to both hubs in order to be ergonomically advantageous to users that have different preferred hand. The second end wall 408 also includes a cover bracket 306 for covering the electric regulator 402 and at least a portion of the manually operable portion 404. The cover 406 is useful for preventing accumulating of oil (grease), or moistures around the electric regulator 402, which may consist of exposed electric terminals.

As above described, both first and second hubs 300, 400 may be subjected to a certain degree of rotational movement during usage of the BBQ grill 100. A friction system (i.e. brake) (not shown) is used to regulate the rotational movement of the hubs 300, 400 and accordingly no specific locking mechanism is incorporated. However, in another embodiment (not shown) a locking mechanism is disposed in either one of the first end wall 308 and second end wall 408, or both for enhanced stability of the hubs and their connected components. Such a locking mechanism could be a latch mechanism that involves the use of a release switch for releasing a hook so as to allow uninterrupted movement of a cog that is connected the hubs.

Figure 5:
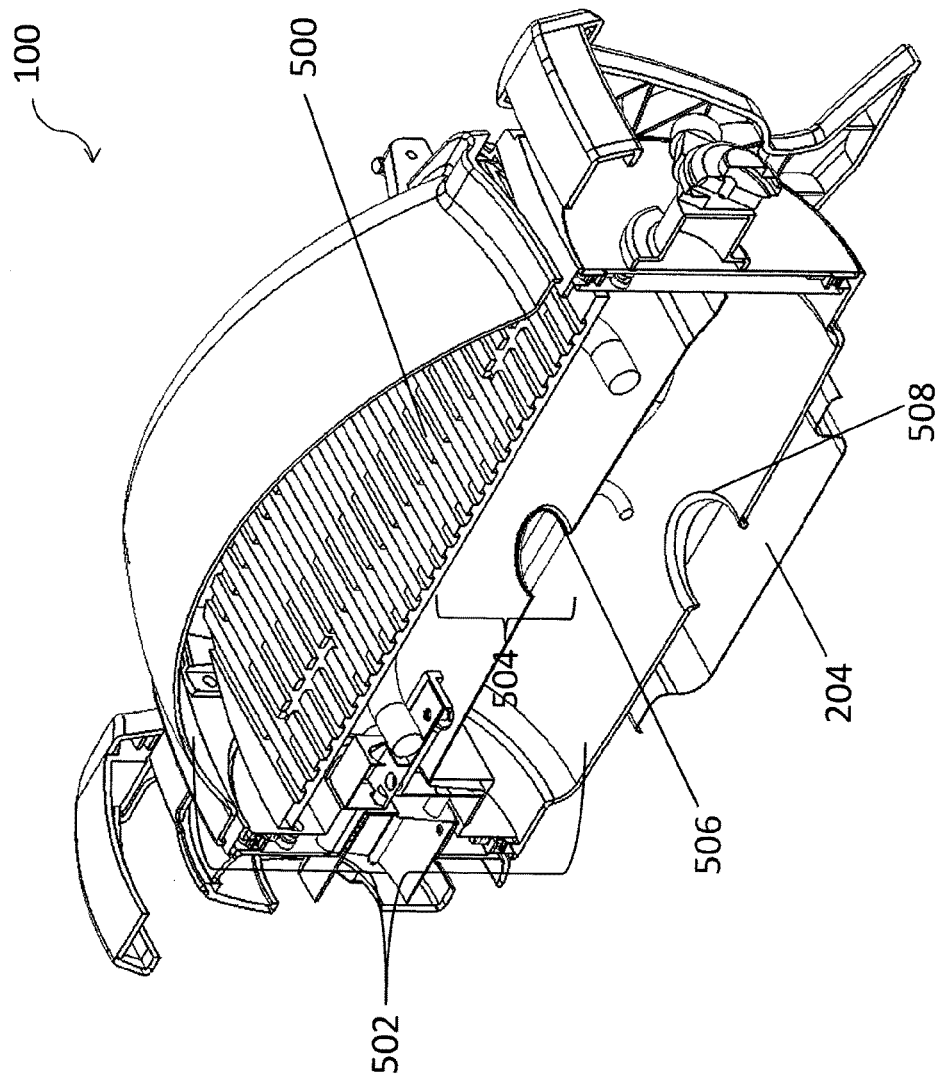
FIG. 5 is a cross sectional view of the BBQ grill of FIG. 1.
Figure 6:
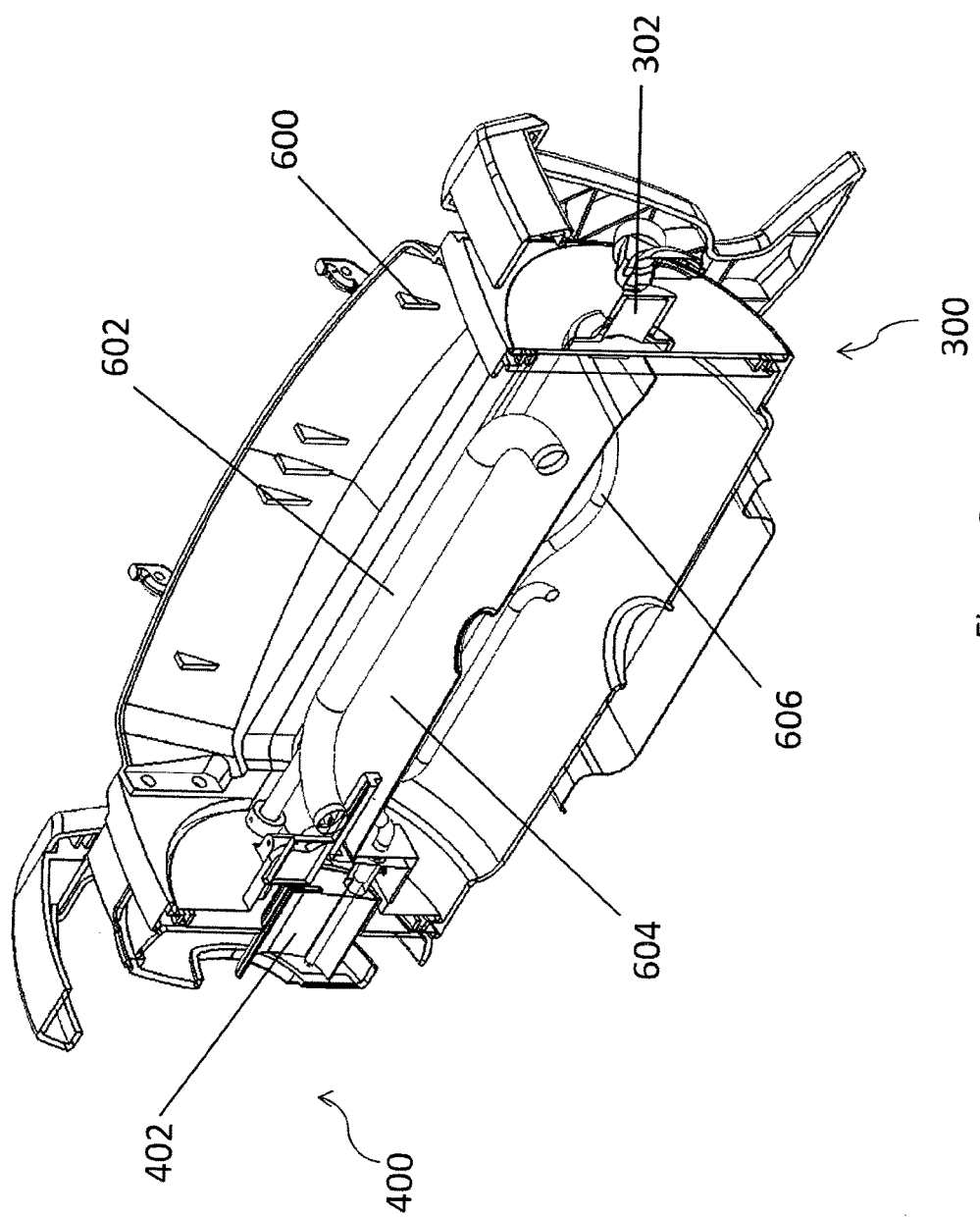
FIG. 6 is a cross sectional view of the BBQ grill of FIG. 1 without the cooking shelf and the movable lid.

Internal to the grill body 102 of the BBQ grill 100 as shown in FIG. 5, there is formed a cooking chamber 502. The cooking chamber 502 has an open top that is used for mounting with a detachable cooking shelf 500 for performing barbecue. The cooking shelf 500 is detachably supported by at least one abutment 600 near the open top of the cooking chamber 502 as shown in FIG. 6. The cooking shelf 500 can (but not limited to) be a griddle, a grate or a pan. Preferably, the cooking shelf is made of a heat-resistant material and coated with non-toxic material so as to ensure the safety of the food being cooked on. Referring back to FIG. 5, the cooking chamber 502 further includes a rotatable cooking unit 504 beneath the cooking shelf 500. The rotatable cooking unit 504 comprises a first drip hole 506 and on the bottom surface of the cooking chamber there is formed a second drip hole 508, which is positioned generally right below the first drip hole. The drip holes 506 and 508 are through holes that are connected to the outside of the cooking chamber 502 and covered by the drip pan 204. In another embodiment, the locations of the drip holes 506, 508 are located offset from the center region of the cooking chamber 502.

The rotatable cooking unit 602 has at least a first cooking mode and a second cooking mode, and a reflector 604. The reflector 604 is movably located between the two cooking modes and has a drip hole 506 formed centrally. The reflector 604 has a first and second reflective surfaces and it may have a straight profile, or a curved profile which is beneficial for enhancing heat radiation. In the embodiment as shown in FIG. 6, the first cooking mode is consisting of a first cooking mode element 602, which is a gas heating element that is connected with the gas regulator 302 of the first hub 300. The second cooking mode is consisting of a second cooking mode element 606, which is an electric heating element that is connected with the electric regulator 402 of the second hub 400. Such a design however is only elaborative but not restrictive as a person skilled in the art may choose to structure the cooking modes in different configurations. The rotatable cooking unit 602 is rotatable buy rotating either one of the hubs or both hubs 300, 400 through preferably 180 degrees to alternatively select a preferred cooking mode. In one embodiment, the second cooking mode 606 is adjacent the concave side of the reflector 604 as the profile of the reflector will enhancing heat radiation of the electric heating element of the second cooking mode element 606, which has a different heat generating characteristic than the first cooking mode element 602.

Figure 7:
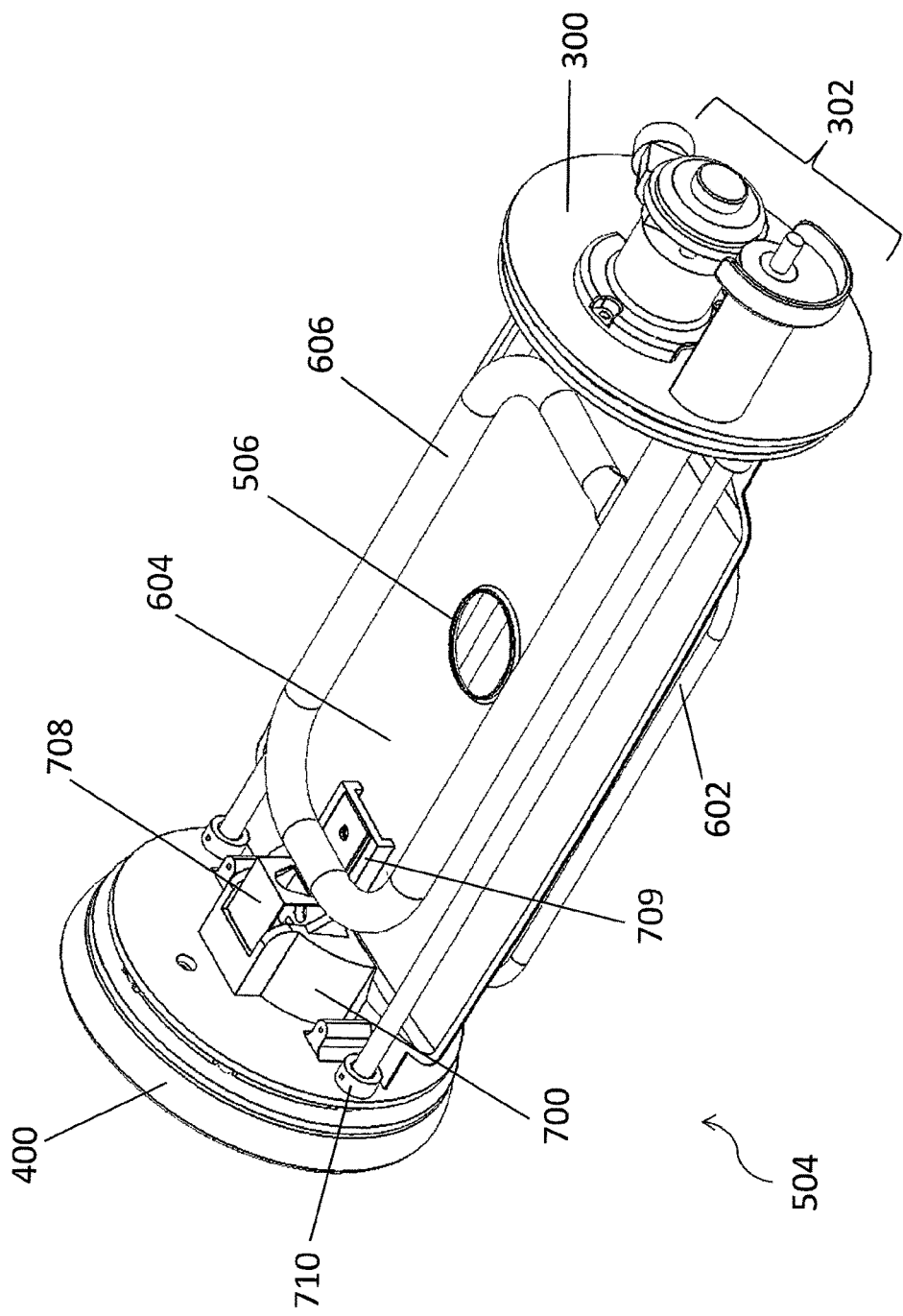
FIG. 7 is a perspective view of a rotatable cooking unit in accordance with one embodiment of the present invention.

Preferably the first and second hubs 300, 400 are to be rotated in a synchronised manner as to allow easy switching between the cooking modes. Accordingly, a frame member 702 is utilised to link the first hub 300 to the second hub 400 to prevent relative movement of one hub to another hub. As shown in FIG. 7, the frame member is consisting of two struts 702 connecting to two axle mounts 710 on each of the hubs 300, 400. The struts 702 are located adjacent the first cooking mode element 602 and the struts also enhance the structural integrity of the rotatable cooking unit 504.

Figure 15:
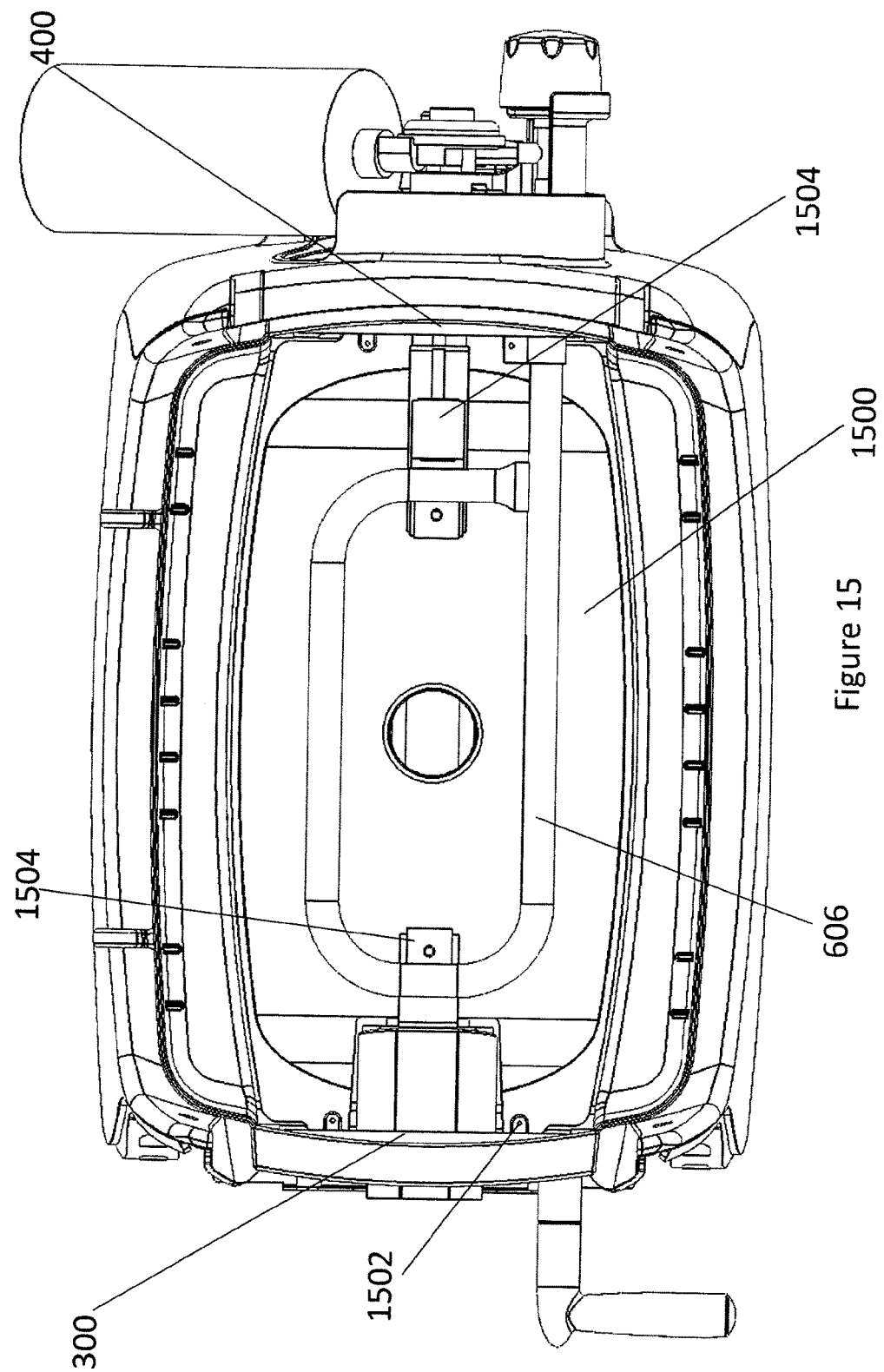
FIG. 15 is a top view of a rotatable cooking unit of FIG. 10.

In an alternative embodiment as shown in FIG. 15, the first and second hubs 300, 400 are connected with each other by the reflector 1500 and the gas burner 606. The reflector 1500 is mounted with both hubs through mounting points 1502 integrally formed on the hubs. Furthermore, the gas burner 606 is mounted with at least one extension 1504 extending from each hub towards the center of the grill body 102. The reflector 1500 of this embodiment may also be removed for better cleaning access simply by undoing the fasteners that are mounting the reflector with the mounting points.

Figure 8:
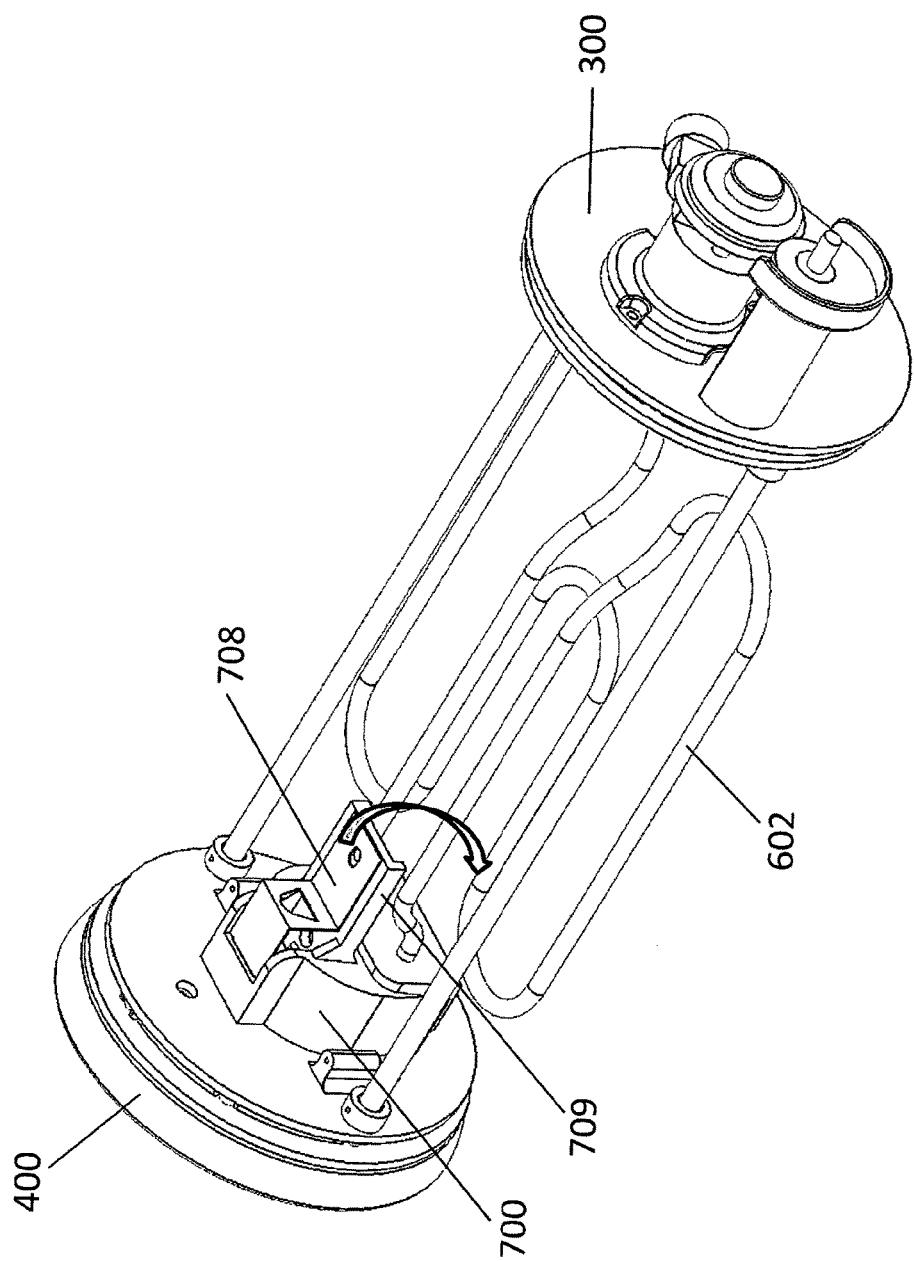
FIG. 8 is a perspective view of the rotatable cooking unit of FIG. 7 without the gas burner and the reflector.

Referring back to FIG. 7, in order to facilitate removal of the reflector 604, the rotatable cooking unit 504 includes a pivoting hinge 700. The pivoting hinge includes a clamp portion consisting of a first cooking mode element positioning device 708 and an integral tab 709. The pivotable second cooking mode element positioning device 708 is used for providing an abutment surface for supporting an end of the first cooking mode element 602 and reduces the stress created from supporting the first cooking mode element at the first hub 300. The reflector 604 is mounted with the cavity between the first cooking mode element positioning device 708 and the integral tab 709. The integral tab 709 can be pivoted toward a direction away from the positioning device 708 as there is the frame member (struts 702) stopping the movement of the reflector should a user decide to remove it from the rotatable cooking unit 504. The integral tab 709 is used for mounting both the reflector 604 and the second cooking mode element 606. The integral tab 709 is part of the electric connection between a power supply and the second cooking mode element 606. The reflector 604 can be removed from the rotatable cooking unit 504 by following the below procedure. Firstly, a user will rotate the rotatable cooking device 504 so that the second cooking mode element 606 is above the second cooking mode element 602. Secondly, the user can pivot the second cooking mode element 606 (together with the reflector 604) toward the direction of the second hub 400 as shown in FIG. 8. Lastly, the user can simply pull the reflector 604 from the pivoting hinge 700 or in another embodiment (not shown), releasing a locking mechanism before pulling the reflector.

In the embodiment as shown in FIG. 7, the first cooking mode element 602 is a gas burner that has a plurality of holes (not shown) formed on the circumference of the burner. The extension of the gas burner forms a loop that is designed to provide a uniform heating zone for a cooking surface whilst providing clearance for food residual to fall through efficiently towards the first drip hole 506 at the center of the reflector 604. The first cooking mode element 602 may also include an igniter for safe ignition of the gas burner. In order to adjust the output of the gas burner, the gas regulator 402 includes an adjustment valve (not shown) that has a continuous level of adjustments between an open and closed position. However, such a valve may also be in the form a separate adapter that is part of the fluid connection between a gas reservoir and the first cooking element.

The second cooking mode element 606 is an electric heating element in the embodiment as shown in FIG. 8. The electric heating element is consisting of a plurality of heating sections jointed to form a higher density of heat generating surfaces than the first cooking mode element 602. The electric heating element can be larger heating wires that generate heat when conducted with electricity.

Figure 9:
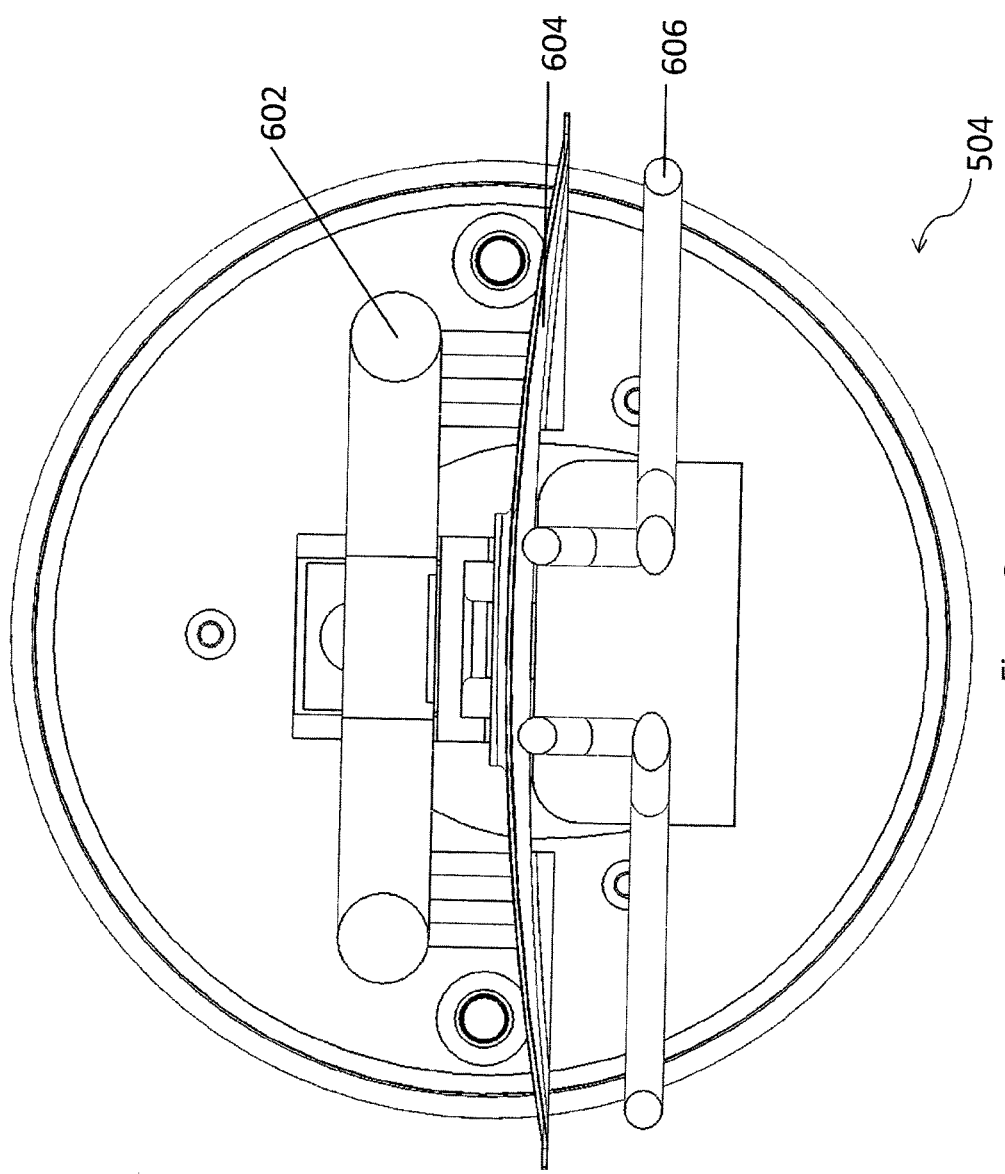
FIG. 9 is a side cross section view of the rotatable cooking unit of FIG. 7.

FIGS. 5 and 9 show the cross section view of the rotatable cooking unit 504. The reflector 604 is shown to roughly divide the internal volume of a cooking chamber 502 into two different volumes, which the volume of the second cooking mode will be lesser than the volume of the first cooking mode. As previously mentioned, the concave shape of the reflector 604 enhances the heat radiation of the second cooking mode element 606. In addition to such an effect, the concave shape of the reflector 604 also effectively reduces the volume of the second cooking mode and in turn reduces the amount of air that has to be heated. Air is highly thermal resistant and therefore by reducing the amount of air that the electric heating element has to heat, a shorter "pre-heat" duration can be achieved and resulting in higher efficiency of the electric cooking mode.

A preferred method for using this grill is described as the following. The different cooking modes of this dual cooking mode BBQ grill can be alternatively selected by rotating the cooking unit located within the cooking chamber through certain degrees, preferably but not restrictively at least 90 to more preferably 180 degrees. The rotation of the cooking unit can be achieved by rotating a manually operable portion of one of the hubs through 180 degrees and the rotation of the manually operable portion will translate into rotation of the cooking unit.

After selecting the desired cooking mode, a user may then wish to connect a respective fuel/power supply to the regulators of the selected cooking mode. For example, a user may connect a gas reservoir with the gas regulator for using the gas burner of the first cooking mode.

Once the fuel/power supply has been configured, the user may choose to close an attached movable lid during "pre heat" for shortening the time required to cook and the lid may also be used to maintain a higher grilling temperature during cooking. A temperature gauge is mounted on an easily visible location on the movable lid for monitoring of the grill temperature to ensure the quality of the food's taste.

Figure 10:
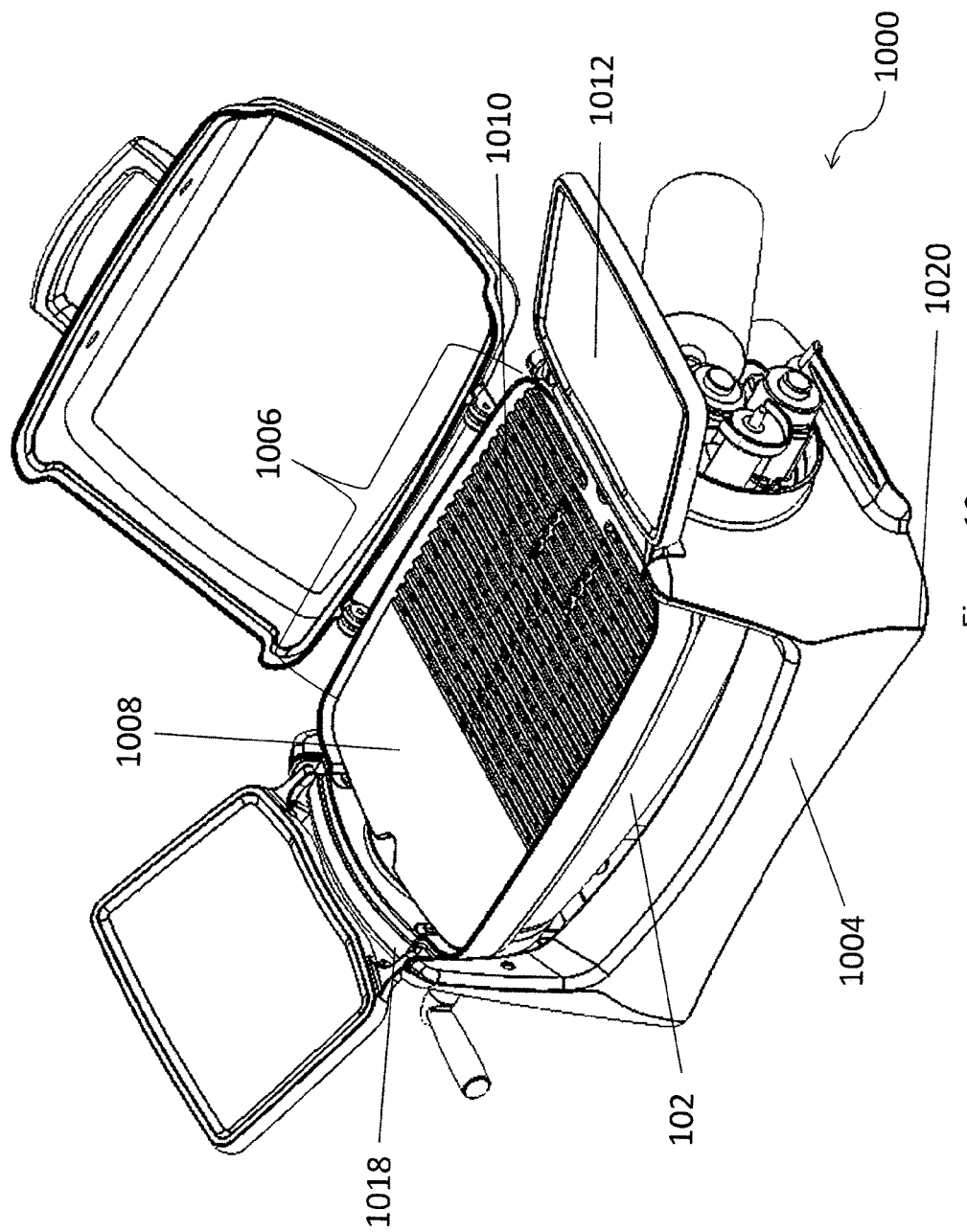
FIG. 10 is a perspective view of a BBQ grill in accordance with another embodiment of the present invention.
Figure 11:
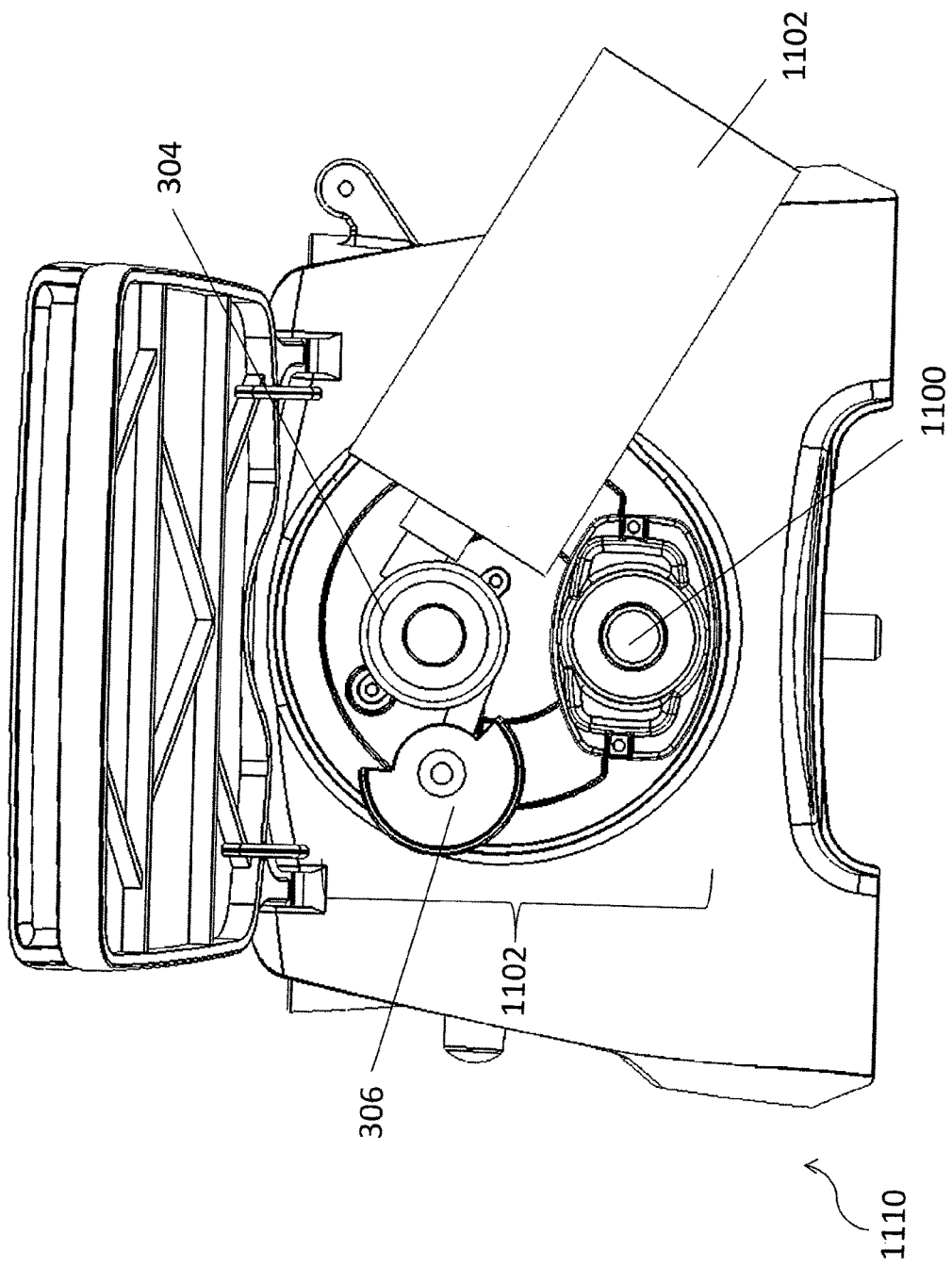
FIG. 11 is a right view of the BBQ grill of FIG. 10.

In an alternative configuration of the present invention with reference to FIG. 10, the dual cooking mode BBQ grill 1000 includes a grill body 102. The grill body 102 includes an open top cooking chamber (not shown) that is covered by a detachable cooking shelf 1006. The cooking shelf 1006 may be a grill, a plate, a griddle, a pan or a combination of any of the mentioned embodiments. As shown in FIG. 10, the cooking shelf 1006 is formed with a combination of a pan and a griddle. The cooking shelf 1006 of the present embodiment may also be dissembled into a first cooking shelf 1008 and a second cooking shelf 1010 as a user may wish to use a different combination of shelves for different cooking needs.

The grill body 102 of the dual cooking mode BBQ grill 1000 is detachably mounted with a frame structure 1004 so that the BBQ grill 1000 can be elevated and supported from a surface. Such a design is advantageous as the surface beneath the grill 1000 can be protected from damage due to high temperature and food residuals. The frame structure 1004 includes a plurality of jointed sections through mechanical means such as welding or fasteners. In another embodiment (not shown) the frame structure maybe integrally formed through machining from a single piece of material such as a metallic alloy or through fabrication of a composite material for reduced weight. The jointed sections of the frame structure 1004 form at least one frame handle 1016 adjacent at least one transverse end of the grill body 102 and at least one leg 1020 on the bottom of the frame structure 1004.

In addition to the frame structure 1004, the dual cooking mode BBQ grill 1000 further includes at least one support shelf 1012 mounted with at least one of the first and second end for supporting items such as food ingredients and cooking apparatus. The support shelf 1012 may be pivotably mounted with a hinge on a frame handle 1018 and the support shelf may be pivoted towards the grill body 102 for compact storage dimension. The movable lid of the dual cooking mode BBQ grill 1000 includes at least one cutout around the open end circumference so as to allow better fitting of the support shelf 1012 beneath the lid.

The dual cooking mode BBQ 1000 further includes a first end and a second end for mounting one of a first or second cooking element in accordance to FIGS. 10 to 13. In this embodiment, the first end 1110 includes a gas regulator 1102 that may include a gas adaptor 304, a gas adaptor bracket 306, an igniter 1100 and a gas source, which is in this example is a gas canister 1102. A user may connect the gas canister's outlet the to the gas adaptor 304 for supplying fuel (i.e. gas) to the first cooking element. In order to ignite the gas burner, an igniter such as a Piezo igniter 1100 may be used. The Pizeo igniter 1100 is mounted together with the gas regulator 1102 at the first end 1110 in this embodiment.

Figure 12:
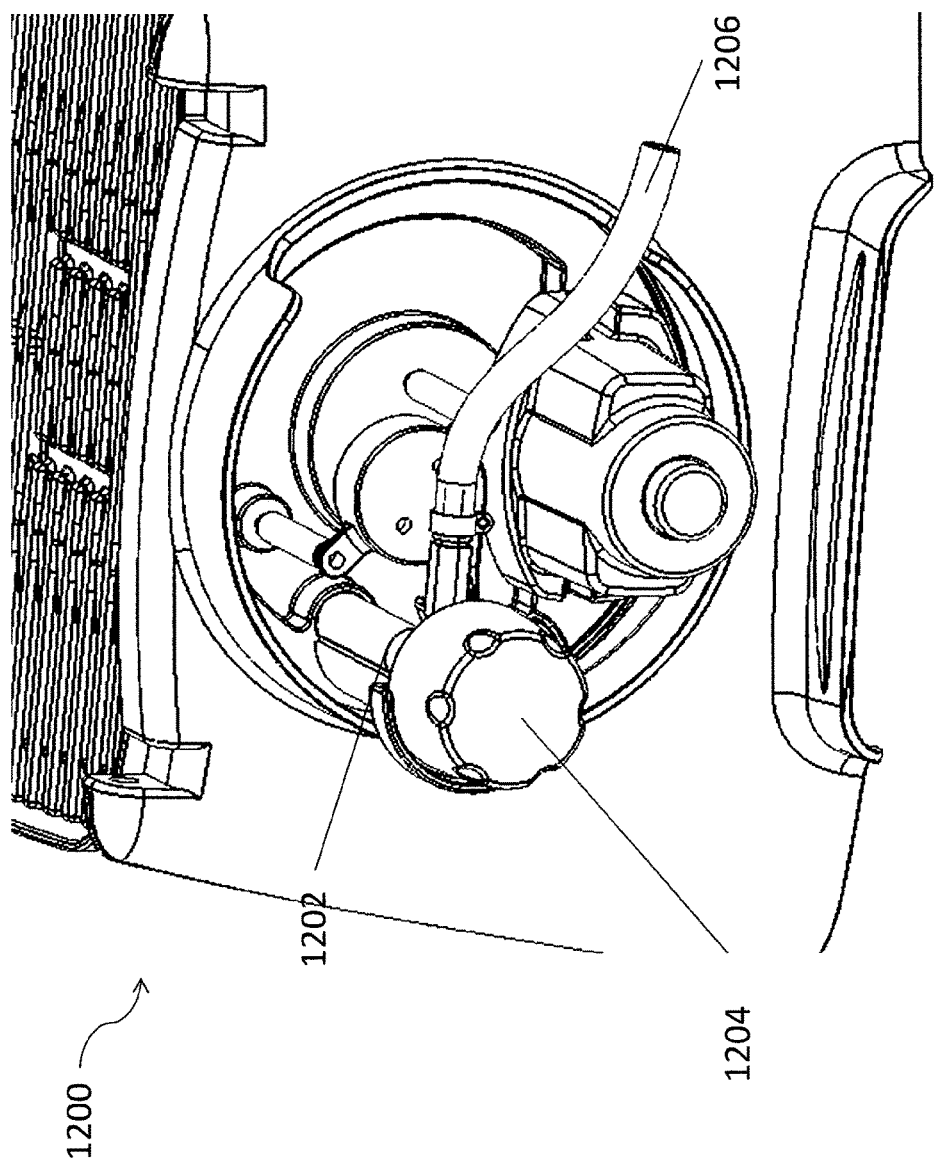
FIG. 12 is a right view of another embodiment of the BBQ grill of FIG. 10.

The first cooking mode of this dual cooking mode BBQ 1000 may alternatively use fuel from a gas bottle as shown in FIG. 12. In this embodiment the gas regulator 1200 may only include an adjustment knob 1204 and a gas adaptor 1202 for connecting a gas feed hose 1206 that is connected to a gas bottle at another end. The gas adaptor 1202 of this embodiment is in the form of a t-valve and the adjustment knob 1204 is mounted at one end of the t-valve whereas another end of the t-valve has an opening for connecting with the gas feed hose 1206. The adjustment knob 1204 provides continuously levels of adjustment with regard to the flow rate of gas from the gas feed tube 1206 and the knob has three operating states. The adjustment knob 1204 can be adjusted from a fully-opened state, a partially opened state and a closed state. In other embodiments (not shown) a lever or other level adjustment mechanism may be used instead of a knob.

Figure 13:
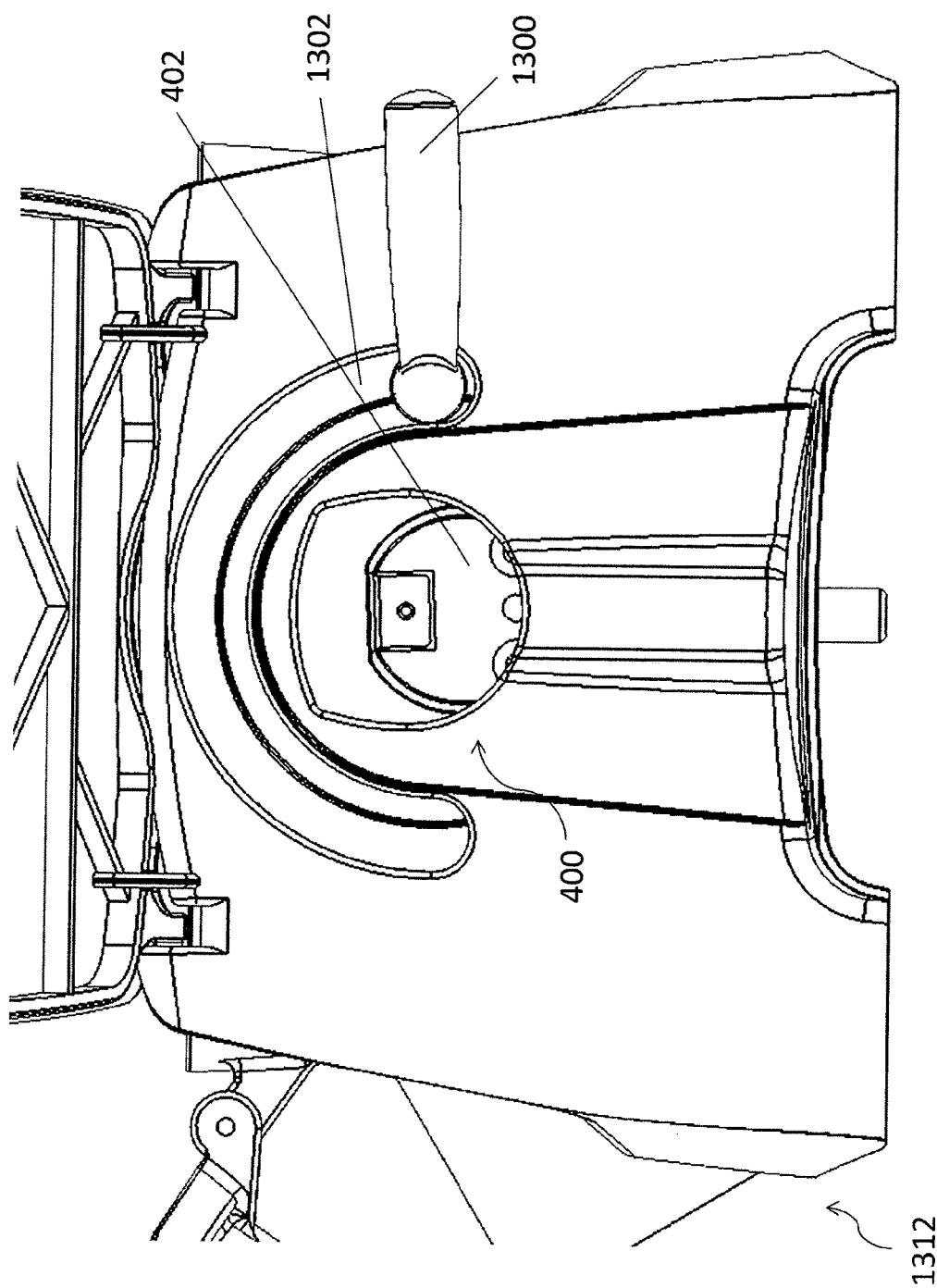
FIG. 13 is a left view of the BBq grill of FIG. 10.

At the other end of the dual cooking mode BBQ grill 1000 there is an electric regulator 400 being mounted with as shown in FIG. 13. The electric regulator 400 includes a socket 402, a thermostat (not shown), an operable lever 1300 and a movement restraint 1302 for the lever. The operable lever 1300 of this embodiment is in the form of an elongated handle and a user has a better control of it as there is more area for allowing contact between the handle and a user's hand. Once a user makes contact with the lever 1300, the user may push or pull the lever along a track defined by a movement restraint 1302. In track in this example is in the shape of a bent ellipse that allows about 180 degrees of movement for the lever 1300. As the operable lever 1300 is connected to a hub mounted with the electric regulator and electric heating element (not shown), the rotational movement of the operable lever 1300 will induce directly related rotational movement of the hub hence the electric regulator and electric heating element.

Figure 14:
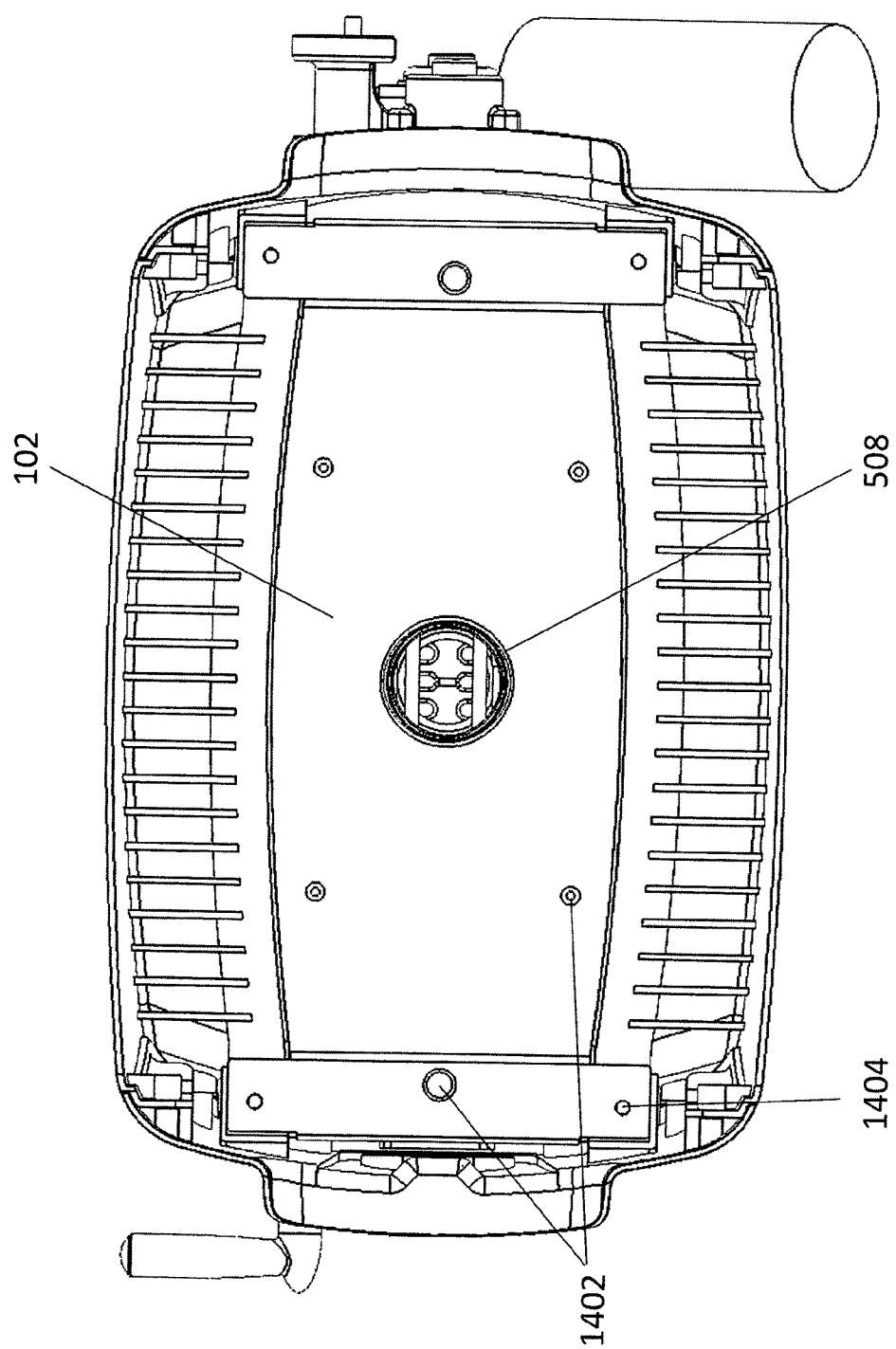
FIG. 14 is a bottom view of the BBQ grill of FIG. 10.

With reference to FIG. 14 there is shown the bottom view of the dual cooking mode BBQ grill 1000. In this embodiment, the dual cooking mode BBQ grill 1000 has a different frame structure 1004 than the other embodiment as previously described. The frame structure 1004 includes at least one truss 1402 that is mounted beneath the grill body 102. Each truss 1402 may have at least one mounting hole 1404 for attaching each truss to a portion of the bottom of the grill body 102. Each truss 1402 includes at least one protrusion 1400 for adapting with another support member (not shown). The bottom of the grill body 102 also includes at least one protrusion 1400 and in this example there are four configured as shown in FIG. 14. The protrusion's dimensions are subjected to variation as there will be different requirements for strength of the protrusions configured at different location. In this example the truss's protrusions have a larger diameter than the protrusions on the bottom of the grill body 102.

Figure 16:
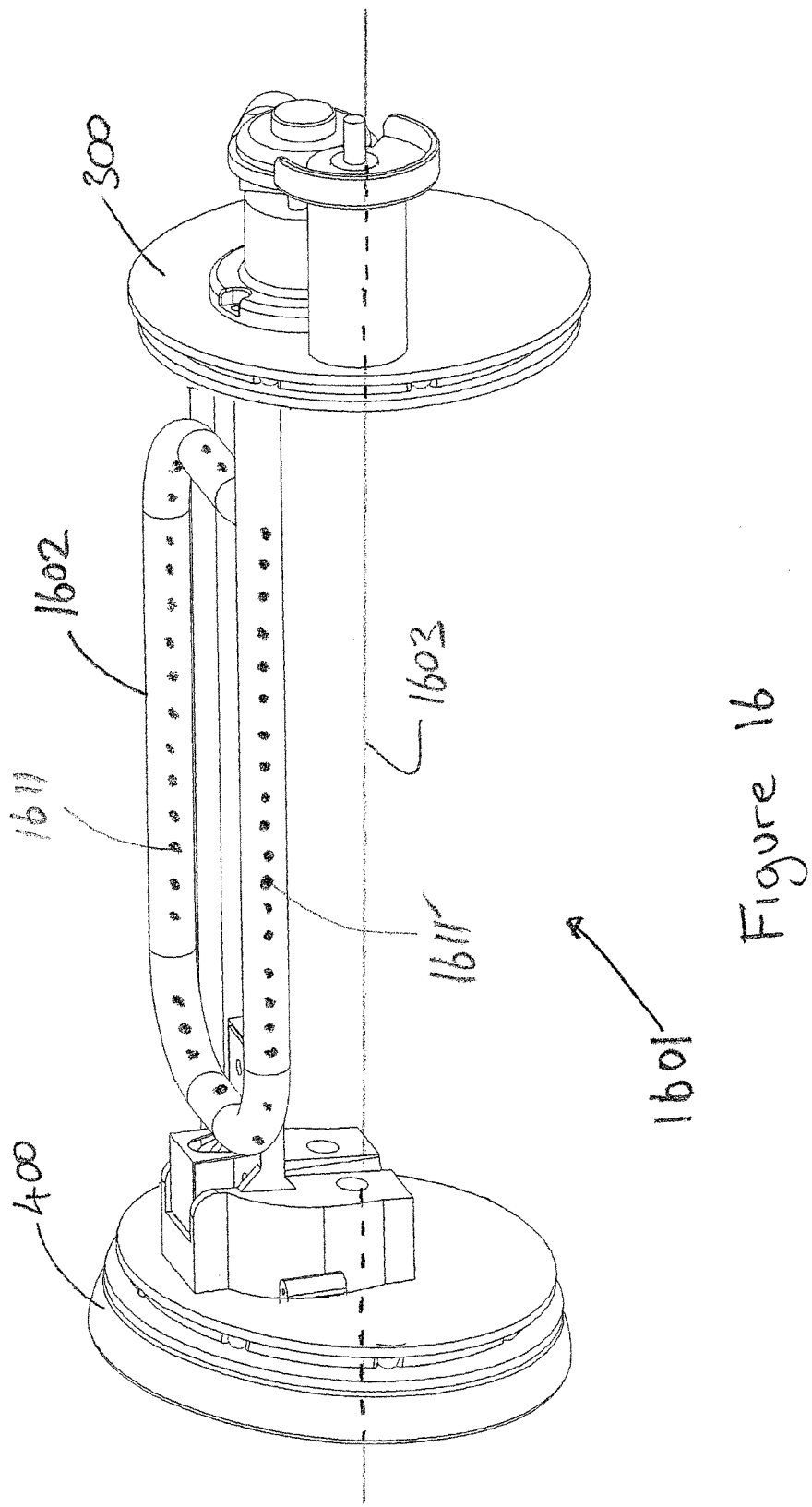
FIG. 16 is a perspective view of a rotatable cooking unit in accordance with an alternative embodiment of the present invention.
Figure 17:
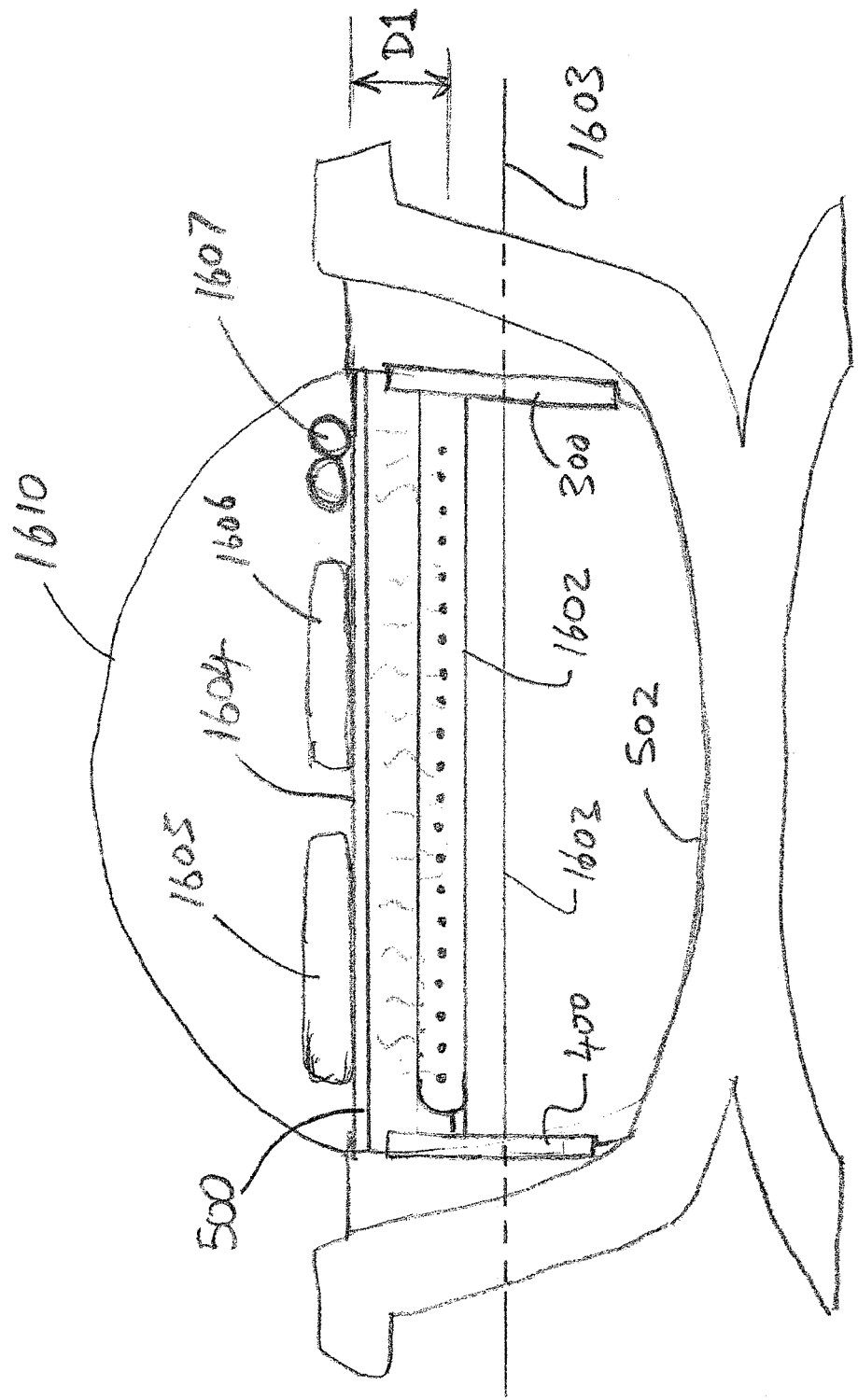
FIG. 17 illustrates a first configuration of a BBQ grill utalising the rotatable cooking unit of FIG. 16.
Figure 18:
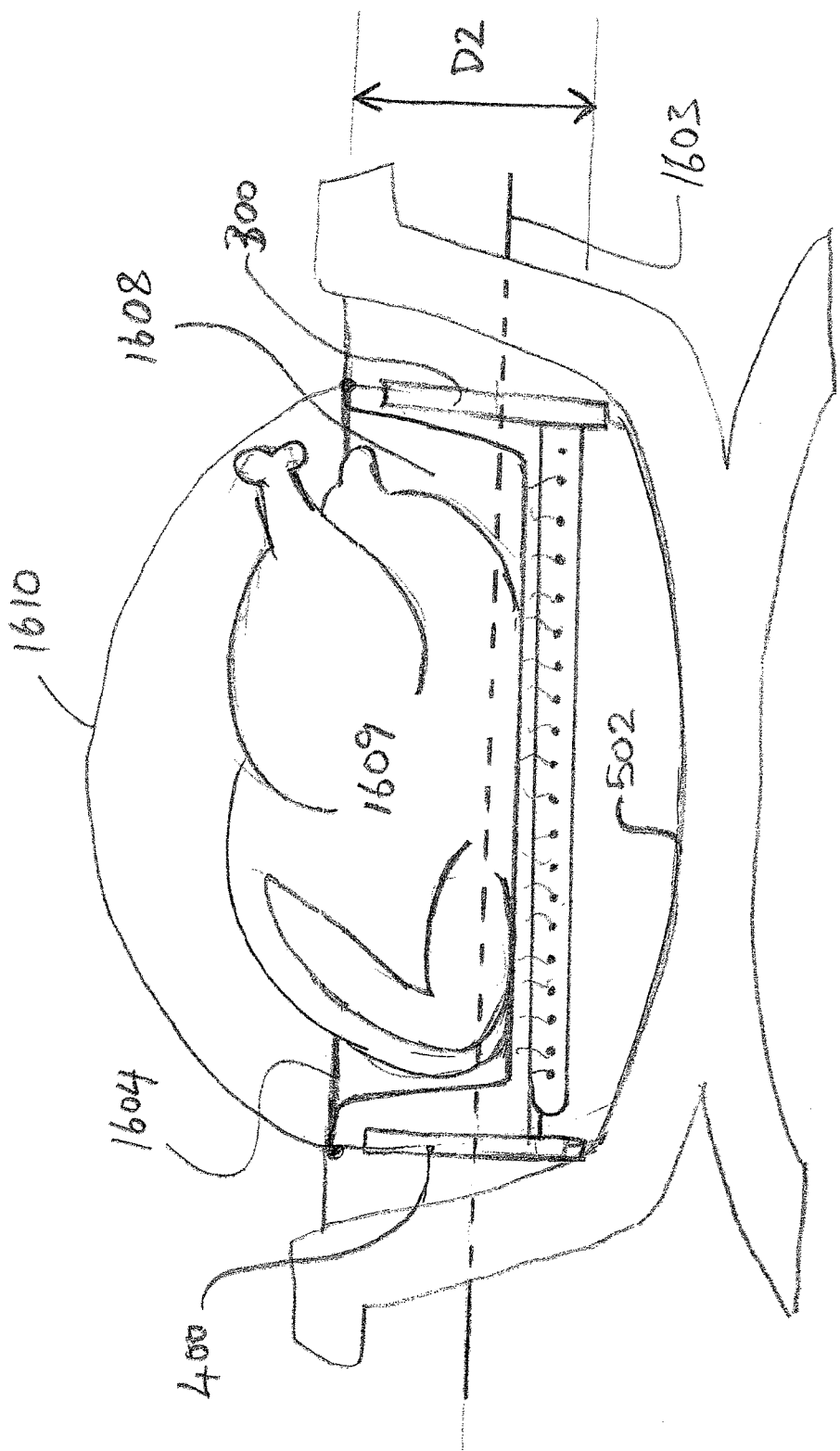
FIG. 18 illustrates a second configuration of a BBQ grill utalising the rotatable cooking unit of FIG. 16.

FIGS. 16 through 18 illustrate a second type of rotatable cooking unit 1601 in accordance with an alternative embodiment of the invention. The second type of cooking unit 1601 has a gas cooking element 1602 located between rotational hubs 300, 400 off-set with respect to a centre line 1603 though a shared rotational axis of the rotational hubs 300, 400. When the rotational cooking unit 1601 is in-situ with the cooking chamber 502 the cooking unit 1601 can be rotationally positioned such that in one cooking mode, illustrated in FIG. 17, the axially off-set gas cooking element 1602 is located within an upper part of the cooking chamber 502 a first distance D1 from the top 1604 of the cooking chamber 502. The rotational cooking unit 1601 can be rotated 180 degrees with respect to its position in the the one cooking mode to an alternative cooking mode, illustrated in FIG. 18, where the axially off-set gas cooking element 1602 is located within a lower part of the cooking chamber 502 a second distance D2 from the top 1604 of the cooking chamber 502. The second distance D2 from the top 1604 of the cooking chamber 502 is greater than the first distance D1 from the top 1604 of the cooking chamber 502. In the one cooking mode, in which the cooking element 1602 is the smaller first distance D1 from the top 1604 of the cooking chamber 502, a cooking shelf 500 such a griddle plate can be used with the BBQ grill to cook steaks 1605, hamburger steaks/paddies 1606, sausages 1607 and the like. In the alternative cooking mode, in which the cooking element 1602 is the larger second distance D2 from the top 1604 of the cooking chamber 502, a deep cooking vessel 1608 such as a skillet or roasting dish can be located within the cooking chamber 502. The alternative cooking mode enables the BBQ grill to be used for roasting whole food items such as a Chicken 1609 for example. The one cooking mode or the alternative cooking mode can use used with the BBG grill lid 1610 in an open or closed position as required. To enable the gas element to be used in a both the one cooking mode or the alternative cooking mode, where the element is alternatively inverted though 180-degrees, the plurality of gas openings—represented by two opensing 1611 and 1611'—can be located along the sides edges of the gas element tube. Alternatively, pluralities of gas openings could be located in both top and bottom edges of the gas element tube. The rotationla arangement of the the cooking unit 1601 is as hereinbefore described with reference to other embodiments.

Figure 19:
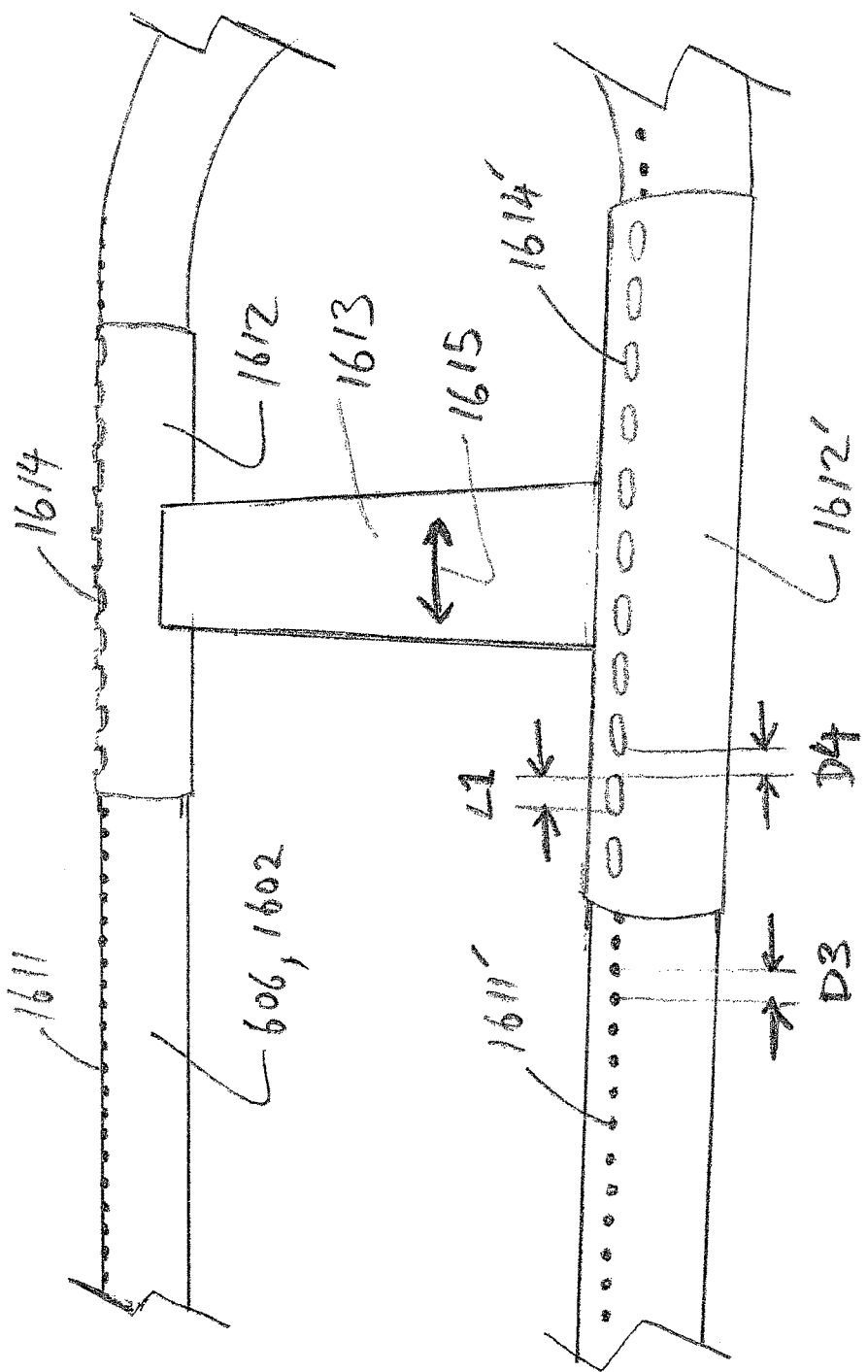
FIG. 19 is a partial perspective view of a gas element having a dual cooking mode sleeve according to yet a further embodiment of the invention.

FIG. 19 is a partial perspective view of a gas element 606, 1602 having a dual cooking mode sleeve unit 1614. The dual cooking mode sleeve unit 1614 has two parallel sleeves 1614 located about parallel adjacent arms of the gas element 606, 1602. The two paralle sleeves 1612 are joined by a cross member 1613 and can be moved together to slide longitudinally along the arms of the gas element 606, 1602 for a small distance in both directions, that is to say the two sleeves 1612 can slide longitudinally backwards and forwards along the gas element 606, 1602. The gas element, as is known, is provided with a plurality of gas openings represented by opening 1611, through which gas passes and burns to produce cooking heat. The plurality of gas openings 1611 are spaced apart a distance D3. The two sleeves 1612 are provided with a plurality of elongate slots represented by 1614 that are positioned to correspond with the position of the gas element openings 1611. Each elongate slot 1614 has a length L1 and a distance between adjacent slots 1614 is a second distance D4. The length L1 of the slots 1614 is marginally longer then distance D3 between gas hole openings 1611 such that in one cooking mode two gas hole openings 1611 are revealed though one slot 1614. The distance D4 between adjacent slots 1614 is marginally shorter then distance D3 between gas hole openings 1611 such that in the one cooking mode each adjacent slot 1614 reveals a pair of adjacent gas openings 1611, such that all gas openings 1611 are revealed. If the dual cooking mode sleeve unit 1614 is moved longitudinally with respect to gas element 606, 1602 a short distance equally to half distance D3 the two sleeves 1614 will block every second gas opening 1611 between the slots 1614 with only every second gas opening 1611 revealed by correspondingly adjacent slots 1614. This movement by half of distance D3 from the one cooking mode position produces an alternative, reduced heat, cooking mode with only half as many revealed gas openings 1611 through which gas passes and burns to produce cooking heat. The dual cooking mode sleeve unit 1614 may only span a portion of the length of the gas cooking element 606, 1602 such that the spanned portion is selectively changeable between the one cooking mode and the alternative, reduced heat, cooking mode, while the un-sleeved portion of the gas element 606, 1602 remains fixed at the maximum heat equal to the one cooking mode heat of the spanned position. The described arrangement produces a zoned cooking effect where the heat produced above a first portion of the gas element can be reduced, while the heat produced above a second portion of the gas element is higher or hotter.

It will be appreciated by persons skilled in the art that numerous variations and/or modifications may be made to the invention as shown in the specific embodiments without departing from the spirit or scope of the invention as broadly described. The present embodiments are; therefore, to be considered in all respects as illustrative and not restrictive.

Any reference to prior art contained herein is not to be taken as an admission that the information is common general knowledge, unless otherwise indicated.

The invention claimed is:
1. A dual cooking mode barbecue (BBQ) grill comprising:
a grill body defining an open top cooking chamber;
a detachable cooking shelf for supporting food to be cooked and positioned above the open top cooking chamber; and
a rotatable cooking unit located within the open top cooking chamber and comprising
a first hub,
a second hub,
a reflector located between the first and second hubs, wherein the reflector has a first reflective surface and a second reflective surface, a gas burner as a first cooking mode element located adjacent the first reflective surface and mounted on the first hub, and an electric heating element as a second cooking mode element located adjacent the second reflective surface and mounted on the second hub, wherein the rotatable cooking unit has a first cooking mode and a second cooking mode, and the first and second cooking modes are alternatively selected by rotating the rotatable cooking unit with respect to the grill body.

2. The dual cooking mode BBQ grill of claim 1, wherein one of the first and second cooking modes is alternatively selectable by rotating the cooking unit through 180 degrees with respect to the other one of the first and second cooking modes.

3. The dual cooking mode BBQ grill of claim 1, wherein the first cooking mode is a gas cooking mode and the second cooking mode is an electric cooking mode.

4. The dual cooking mode BBQ grill of claim 1, wherein the reflector is removably supported between the first and second hubs.

5. The dual cooking mode BBQ grill of claim 4, wherein the first and second reflective surfaces of the reflector are opposite each other.

6. The dual cooking mode BBQ grill of claim 1 further including a frame member connected to the first and second hubs.

7. The dual cooking mode BBQ grill of claim 1, wherein the first and second hubs are connected to each other by the first cooking mode element.

8. The dual cooking mode BBQ grill of claim 1, wherein the first and second hubs are connected to each other by the reflector.

9. The dual cooking mode BBQ grill of claim 1, wherein the grill body comprises a first end wall and a second end wall defining respective ends of the open top cooking chamber, and the first hub is rotatably mounted to the first end wall and the second hub is rotatably mounted to the second end wall.

10. The dual cooking mode BBQ grill of claim 9, wherein the first end wall includes a first aperture, the first hub is rotatably located within the first aperture, the second end wall includes a second aperture, and the second hub is rotatably located within the second aperture.

11. The dual cooking mode BBQ grill of claim 1 further comprising a locking mechanism having a locking position and a released position, wherein, in the locking position, the locking mechanism rotationally locks one of the first and second hubs with a respective one of the first and second walls.

12. The dual cooking mode BBQ grill of claim 1 further comprising a handle mounted to one of the first and second hubs and rotatable through at least 180 degrees for rotating the rotatable cooking unit through 180 degrees.

13. A dual cooking mode barbecue (BBQ) grill comprising:

a grill body defining an open top cooking chamber;

a detachable cooking shelf for supporting food to be cooked and positioned above the open top cooking chamber; and a rotatable cooking unit located within the open top cooking chamber and comprising a first hub, a second hub, a reflector located between the first and second hubs, wherein the reflector has a first reflective surface and a second reflective surface, a gas burner as a first cooking mode element located adjacent the first reflective surface and a gas regulator mounted on the first hub and in fluid communication with the gas burner, and an electric heating element as a second cooking mode element located adjacent the second reflective surface and an electric regulator mounted on the second hub and electrically connected with the electric heating element, wherein the rotatable cooking unit has a first cooking mode and a second cooking mode, and the first and second cooking modes are alternatively selected by rotating the rotatable cooking unit with respect to the grill body.

14. The dual cooking mode BBQ grill of claim 13, wherein the gas regulator further comprises a gas adapter and an adjustment valve which has a continuous level of adjustments between open and closed positions, and the electric regulator further comprises an electric socket and a thermostat for regulating electrical power supplied to the electric heating element.

15. A method of changing a dual cooking mode barbecue (BBQ) grill between a first cooking mode and a second cooking mode wherein the dual cooking mode barbecue BBQ grill comprises a grill body defining an open top cooking chamber, a detachable cooking shelf for supporting food to be cooked and positioned above the open top cooking chamber, and a rotatable cooking unit located within the open top cooking chamber and comprising a first hub, a second hub, a reflector located between the first and second hubs, wherein the reflector has a first reflective surface and a second reflective surface, a gas burner as a first cooking mode element located adjacent the first reflective surface and mounted on the first hub, and an electric heating element as a second cooking mode element located adjacent the second reflective surface and mounted on the second hub, wherein the rotatable cooking unit has a first cooking mode and a second cooking mode, and the first and second cooking modes are alternatively selected by rotating the rotatable cooking unit with respect to the grill body, and the method comprises rotating the rotatable cooking unit within the open top cooking chamber of the grill, through 180 degrees to select the first or second cooking mode.

16. The method of claim 15, comprising supplying gas to the gas burner in the first cooking mode and supplying electricity to the electric heating element in the second cooking mode.

* * * * *